(12) United States Patent
Pizzuti et al.

(10) Patent No.: US 10,132,665 B2
(45) Date of Patent: Nov. 20, 2018

(54) ELECTROMAGNETIC FLOWMETER AND METHOD OF USING SAME

(71) Applicant: Invensys Systems, Inc., Foxboro, MA (US)

(72) Inventors: James L. Pizzuti, West Warwick, RI (US); Antoine DeProost, Wrentham, MA (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 767 days.

(21) Appl. No.: 14/614,941

(22) Filed: Feb. 5, 2015

(65) Prior Publication Data
US 2016/0231152 A1    Aug. 11, 2016

(51) Int. Cl.
*G01V 3/00* (2006.01)
*G01F 1/60* (2006.01)
*G01F 1/58* (2006.01)

(52) U.S. Cl.
CPC ............... *G01F 1/60* (2013.01); *G01F 1/584* (2013.01)

(58) Field of Classification Search
CPC .................................. G01F 1/60; G01F 1/584
USPC ........................................................ 324/306
See application file for complete search history.

(56) References Cited

U.S. PATENT DOCUMENTS

| | | | | |
|---|---|---|---|---|
| 2004/0140800 A1* | 7/2004 | Madio | ................. | G01N 24/081 324/303 |
| 2007/0225922 A1* | 9/2007 | Foss | ........................ | G01F 1/60 702/45 |
| 2009/0099724 A1* | 4/2009 | Kranz | ..................... | G01F 1/115 701/33.4 |
| 2009/0260452 A1* | 10/2009 | Rasmussen | ............. | G01F 1/588 73/861.12 |
| 2010/0224008 A1* | 9/2010 | Foss | ........................ | G01F 1/586 73/861.12 |
| 2010/0275701 A1* | 11/2010 | Foss | ........................ | G01F 1/58 73/861.12 |
| 2011/0056307 A1* | 3/2011 | Yamamoto | ................ | G01F 1/58 73/861.12 |
| 2015/0082906 A1* | 3/2015 | Foss | ........................ | G01F 1/60 73/861.12 |
| 2016/0223372 A1* | 8/2016 | Sakano | .................... | G01F 1/588 |
| 2016/0313155 A1* | 10/2016 | Iwashita | .................. | G01F 1/588 |

OTHER PUBLICATIONS

Better Flowmeter Management with EDDL, Water & Wastewater Asia, 2009, pp. 42-44.*

* cited by examiner

*Primary Examiner* — Susan Lee
(74) *Attorney, Agent, or Firm* — Senniger Powers

(57) ABSTRACT

A magnetic flowmeter has a transmitter module that generates a drive signal for driving a magnetic field in a flowing fluid. A flowtube module samples a voltage induced in the fluid by the magnetic field and generates a measurement signal. A single communication path carries the drive signal from the transmitter module to the flowtube module and the measurement signal from the flowtube module to the transmitter module. The flowtube module generates a digital measurement signal. The flowtube module can include a processor for bundling the measurement signal with other information such as calibration data for the flowtube. In addition, the processor can control the timing of flowtube module operations so that the flowtube module samples the induced voltage and transmits the measurement signal to the transmitter module at different times.

21 Claims, 5 Drawing Sheets

ELECTROMAGNETIC FLOWMETER AND METHOD OF USING SAME

FIELD OF INVENTION

Aspects of the present invention generally relate to electromagnetic flowmeters. More particularly, aspects relate to an electromagnetic flowmeter with a flowtube module that transmits a sampled measurement signal to a transmitter module that determines a flow rate from the sampled measurement signal.

BACKGROUND

Electromagnetic flowmeters are commonly used in various industries to measure the flow rate of conductive fluids flowing through pipelines or other conduits. In principle, electromagnetic flowmeters generate a magnetic field in conductive fluid. When the conductive fluid is flowing, the magnetic field induces a voltage difference between two locations in the fluid that are spaced apart in a direction transverse to the fluid flow. The magnitude of the voltage difference is related to flow rate. By detecting such a voltage difference, fluid flow rate can be measured.

Conventionally, electromagnetic flowmeters are used as field devices in a process control system. A transmitter is typically used to communicate a flow measurement taken by an electromagnetic flowmeter to a process control network. Since the induced voltage measurement is an analog signal, which is prone to signal degradation, the transmitter must be physically located near other hardware components of the flowmeter to ensure measurement accuracy. Moreover, the wiring between a transmitter and other components of an electromagnetic flowmeter can be burdensome because separate sets of wires carry signals for generating an electromagnetic field and detecting an induce voltage. Accordingly, an improved electromagnetic flowmeter is desired.

SUMMARY

Briefly, aspects of the present invention relate to an electromagnetic flowmeter that communicates a drive signal for generating a magnetic field in a flowing fluid over the same communication path that carries a measurement signal representative of fluid flow. A single communication path connects a transmitter module that generates a drive signal to a flowtube module that provides a measurement signal. In certain embodiments, the flowtube module samples and digitizes an analog induced voltage signal. Digitization of the measurement signal enables it to be transmitted over long wire lengths to the transmitter module with minimal loss. As a result, the transmitter module can be located remote from the flowtube module where it is convenient to provide power to the transmitter module and where the transmitter module is substantially free from hazards. The flowtube module can store calibration data locally and transmit it along with the digital measurement signal in a data packet. This allows transparent changeover of transmitter modules because new transmitter modules do not need to be loaded with dedicated calibration data for the flowmeter. When a single communication path is used to communicate a drive signal from a transmitter module to a flowtube module and a measurement signal from a flowtube module to a transmitter module, measurement accuracy can be improved by sampling the induced voltage and transmitting the sampled induced voltage at different times.

In one aspect, a magnetic flowmeter comprises a flowtube module configured to sample a voltage induced in a fluid flowing through a flowtube and to generate a measurement signal representative thereof. The voltage is induced in response to a magnetic field applied to the fluid. A transmitter module is configured to generate a drive signal for driving the magnetic field applied to the fluid and to measure a flow rate of the flowing fluid as a function of the measurement signal. A communication path between the flowtube module and the transmitter module communicates both the drive signal from the transmitter module to the flowtube module and the measurement signal from the flowtube module to the transmitter module.

In another aspect, a magnetic flowmeter comprises a flowtube configured to carry a flowing fluid. A magnetic field source is configured to apply a magnetic field to the flowing fluid. A pair of electrodes is configured to measure a voltage induced in the flowing fluid between the electrodes in response to the magnetic field. A flowtube module is connected to the pair of electrodes and configured to receive an analog measurement signal representative of the voltage between the electrodes. The flowtube module comprises an analog to digital converter configured to convert the analog measurement signal into a digital measurement signal. A transmitter module is configured to receive the digital measurement signal from the flowtube module, determine a flow rate of the flowing fluid from the digital measurement signal, and provide an output signal representative of the flow rate of the flowing fluid.

In still another aspect, a magnetic flowmeter comprises a flowtube configured to carry a flowing fluid. A magnetic field source is configured to apply a magnetic field in the flowing fluid. A pair of electrodes is configured to detect a voltage induced in the flowing fluid between the electrodes in response to the magnetic field. A flowtube module is configured to sample the detected voltage and generate a measurement signal representative of the voltage. A transmitter module is configured to generate a drive signal for driving the magnetic field applied to the fluid and to measure a flow rate of the flowing fluid as a function of the measurement signal. The flowtube module samples the detected induced voltage and transmits the measurement signal to the transmitter module at different times.

Still other aspects, embodiments, objects and features of the present invention will be apparent and in part pointed out hereinafter.

BRIEF DESCRIPTION OF THE DRAWINGS

Corresponding reference characters indicate corresponding features throughout the drawings.

DETAILED DESCRIPTION

Figure 1:
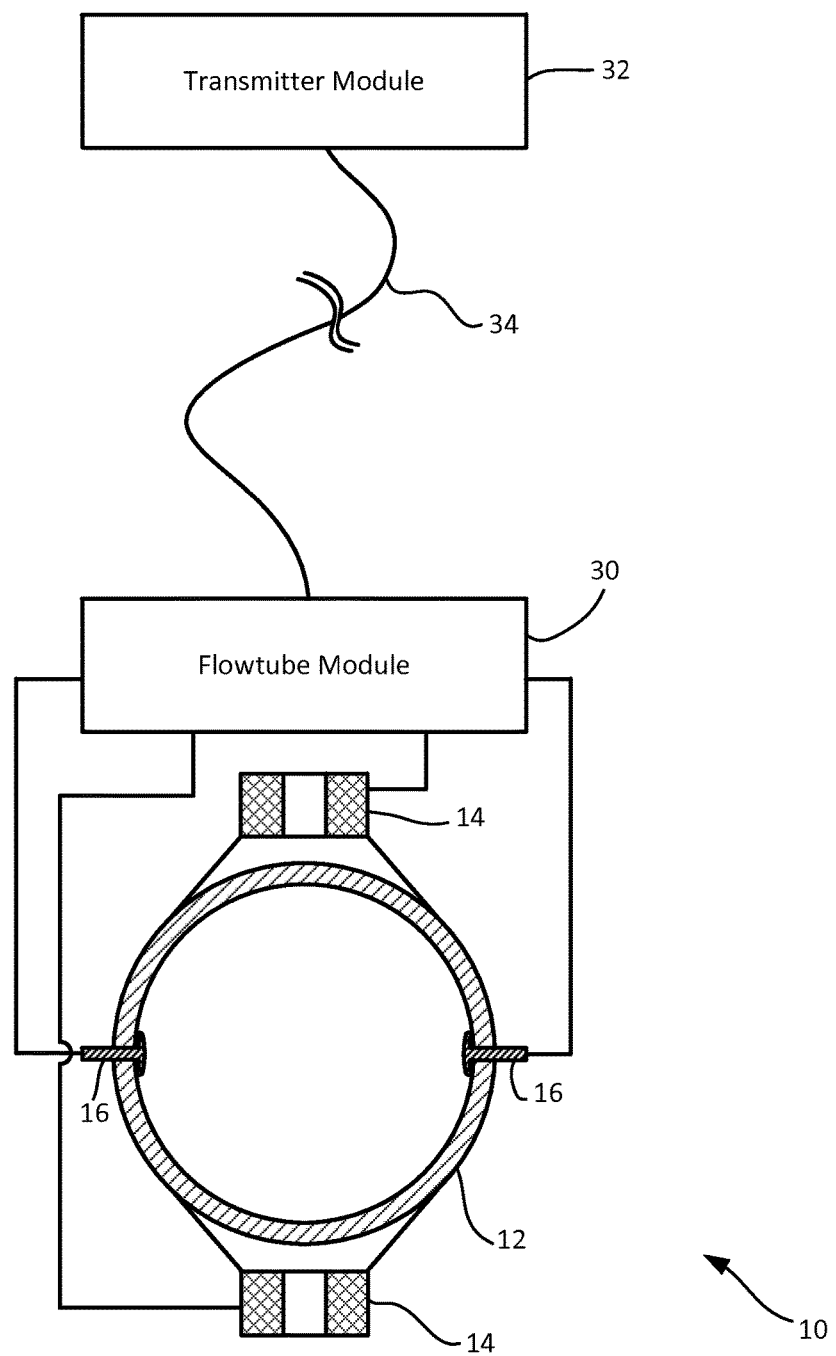
FIG. 1 is a schematic block diagram of an electromagnetic flowmeter embodying aspects of the invention.

Referring to FIG. 1, an electromagnetic flowmeter for measuring a flow rate of a fluid is generally indicated at 10.

The electromagnetic flowmeter 10 includes a flow tube 12 configured to carry a flowing fluid. The flowtube 12 can be inserted into a pipeline or other conduit in a processing facility or other suitable location. The illustrated flowmeter 10 includes a pair of drive coils 14 (broadly, a magnetic field source). The drive coils 14 are configured to carry a reversible current for generating a magnetic field in the fluid flowing through flowtube 12. The drive coils 14 in the illustrated embodiment are mounted at diametrically opposed positions relative to the flowtube 12 and do not contact the fluid. As discussed in greater detail below, coils 14 receive a drive signal and generate a magnetic field in a fluid flowing through flowtube 12 in response to a drive signal.

A pair of electrodes 16 (broadly, a voltage measurement instrument) configured to measure a voltage induced in the fluid by drive coils 14 extends through the wall of the flowtube 12 to contact the fluid at diametrically opposed locations. The electrodes 16 output an analog signal representative of the voltage difference between the two electrodes (i.e., an analog induced voltage signal). The analog induced voltage signal is related to the flow rate of the fluid flowing through flowtube 12. Although the illustrated electromagnetic flowmeter 10 uses the coils 14 as an electromagnetic field source and the electrodes 16 as a voltage measurement instrument, it will be understood that other electromagnetic flowmeters can be constructed differently without departing from the scope of the invention.

The illustrated electromagnetic flowmeter 10 includes a flowtube module 30 located near flowtube 12 and a transmitter module 32 located remote from the flowtube. The flowtube module 30 and the transmitter module 32 are connected via a single communication path 34, which in the preferred embodiment is a two-wire communication path. The transmitter module 32 is located remotely from flowtube 12 in the illustrated embodiment but it will be understood that the transmitter module can also be located near the flowtube without departing from the scope of the invention.

As will be discussed in greater detail below, flowtube module 30 is configured to sample the analog induced voltage signal from electrodes 16 and generate a digital measurement signal that is transmitted to transmitter module 32 via the communication path 34. The transmitter module 32 is configured to receive the digital measurement signal from flowtube module 14 and calculate a flow rate as a function of the digital measurement signal. The transmitter module 32 is further configured to generate a drive signal that is received by flowtube module 30 and supplied to coils 14 for generating a magnetic field in the flowing fluid. The communication path 34 is configured to carry the drive signal from transmitter module 32 to flowtube module 30 and the measurement signal from the flowtube module to the transmitter module. Moreover, the flowtube module 30 and transmitter module 32 communicate bi-directionally with digital communication signals (e.g., the measurement signal) superimposed on the drive signal and transmitted via the communication path 34.

Figure 2:
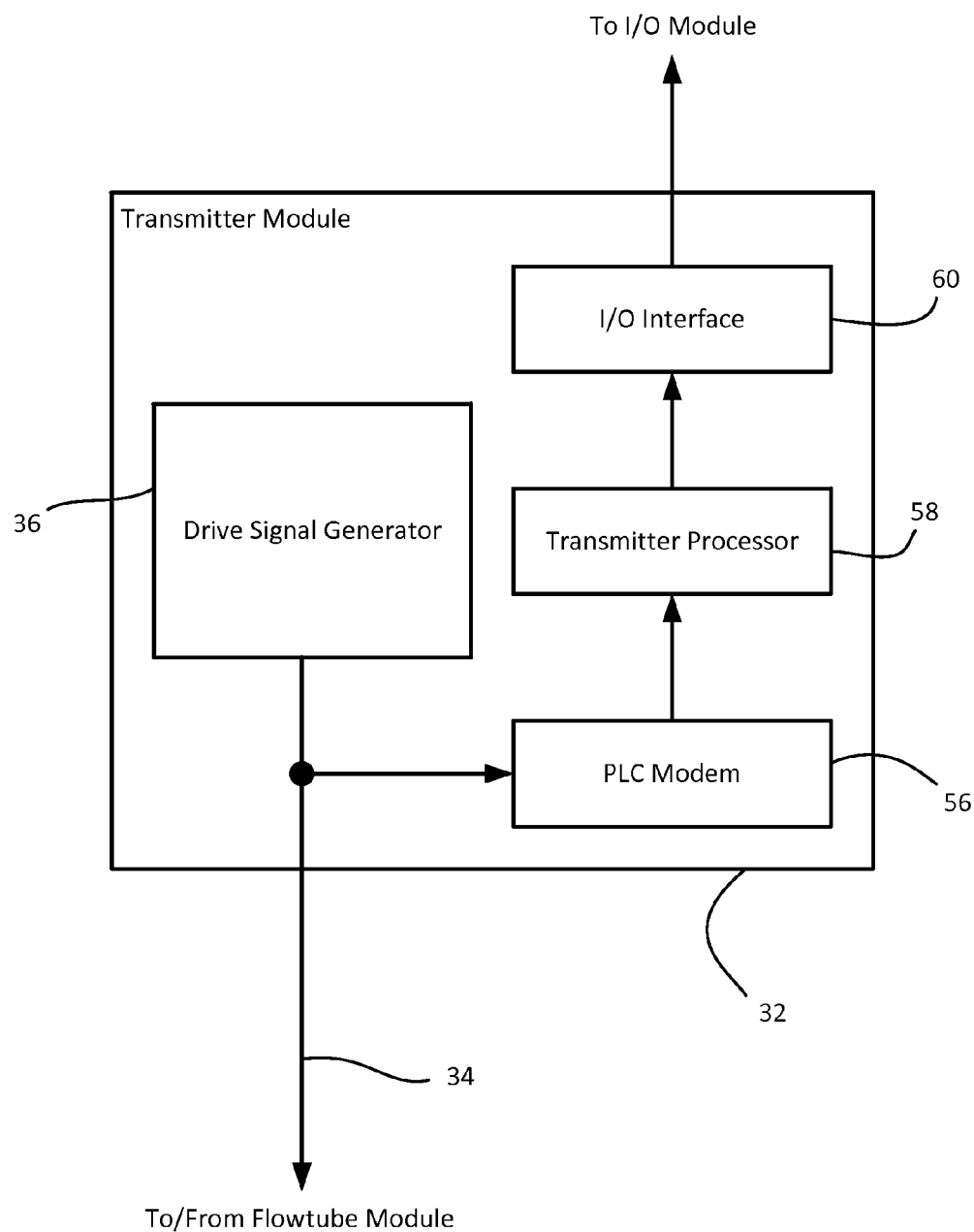
FIG. 2 is a schematic block diagram of a transmitter module of the electromagnetic flowmeter.
Figure 3:
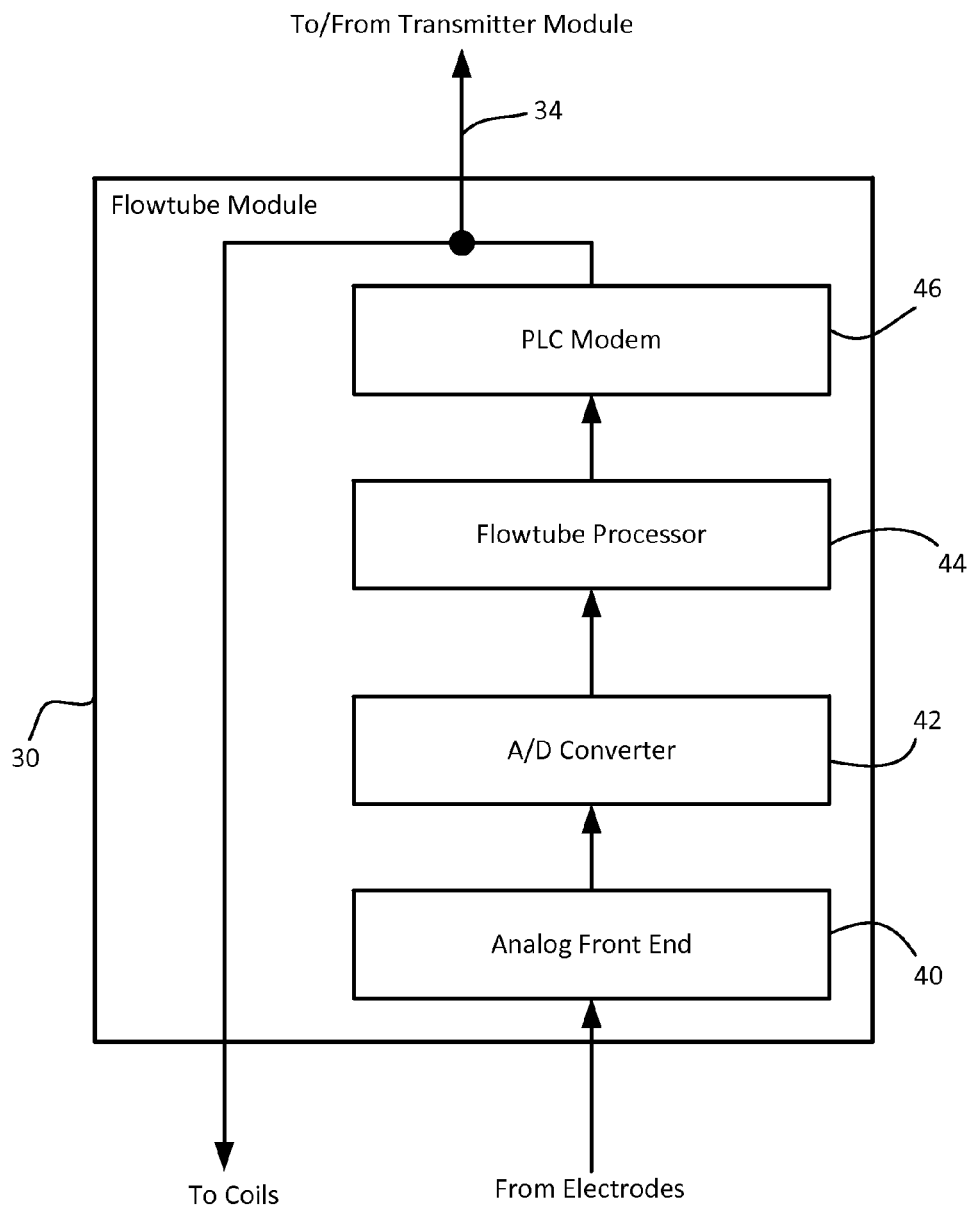
FIG. 3 is a schematic block diagram of a flowtube module of the electromagnetic flowmeter.

Referring to FIG. 2, transmitter module 32 includes a drive signal generator 36 that produces a variable drive signal that energizes coils 14 to induce an electromagnetic field in the flowing fluid. Preferably the drive signal generator 36 receives power from an external power source (not shown). The drive signal generator 36 is connected to communication path 34, which carries the drive signal to the flowtube module 30. As shown in FIG. 3, flowtube module 30 is electrically connected to coils 14 and transmits the drive signal from communication path 34 to the coils, which energizes the coils and induces a magnetic field in the fluid flowing through flowtube 12. In one or more alternative embodiments, the drive signal generator 36 can be removed from the transmitter module 32. Instead of transmitting a drive signal to the flowtube module, the transmitter module can provide DC power to the flowtube module over a communication path. In such an embodiment, the flowtube module includes circuitry for converting the DC power provided by the transmitter module into a drive signal and supplying the drive signal to the coils. Just as in the illustrated embodiment, it is contemplated that flowtube module and transmitter modules would communicate bi-directionally by superimposing a digital communications signal over the DC power provided by the transmitter module.

With further reference to FIG. 3, flowtube module 30 is also electrically connected to electrodes 16 to receive the analog induced voltage signal from the electrodes. The illustrated flowtube module 30 includes an analog front end 40 that receives the analog induced voltage signal from electrodes 16. The analog front end 40 processes the analog induced voltage signal to improve the quality of the analog signal. Although any suitable analog signal processing technique can be performed by an analog front end without departing from the scope of the invention, it is particularly contemplated that analog front end 40 filters the analog induced voltage signal to reduce the effects of aliasing, harmonics, and other sources of noise. In addition the analog front end 40 normalizes the signal and applies a gain.

The flowtube module 30 also includes an analog-to-digital converter 42 that is connected to analog front end 40. The analog-to-digital converter 42 samples the processed output of the analog front end (i.e., the processed analog induced voltage signal) and generates a digital measurement signal that represents the voltage difference between the two electrodes 16.

In the illustrated embodiment, analog-to-digital converter 42 is connected to a flowtube processor 44 configured to generate digital data packets combining the digital measurement signal with other information such as measurement data, diagnostic data, tube identity data, calibration data, etc. For example, a preferred flowtube processor 44 is connected to a processor-readable storage medium (not shown) that stores calibration data for flowmeter 10. The preferred flowtube processor 44 generates data packets including both the digital measurement signal and the calibration data for flowmeter 10. Since the calibration data for flowmeter 10 is transmitted with the measurement data, transmitter module 32 does not need to store calibration data for the flowmeter. As a result, when transmitter module 32 is changed for maintenance or other reasons, a new transmitter module can be substituted without downtime for loading calibration data or recalibrating flowmeter 10.

In addition to producing data packets, flowtube processor 44 is configured to control the timing of various functions performed by the flowtube module 30. For example, processor 44 can, in certain embodiments, be configured to control analog-to-digital converter 42 so that it only samples the processed analog induced voltage signal within certain sampling windows. Additionally or in the alternative, processor 44 can select digital measurement values for outputting to transmitter module 32 that correspond to samples of the analog induced voltage signal taken by analog-to-digital converter 42 during high-accuracy sampling windows. Likewise, flowtube processor 44 is preferably configured to control the timing for transmitting the digital measurement signal on communication path 34, as discussed in greater detail below.

The flowtube module 30 further includes a power line communication modem 46, which, in the illustrated embodiment, is connected to the output of flowtube processor 44. The power line communication modem 46 receives the digital measurement signal, as well as any other additional information contained in the data packets produced by processor 44, and transmits the digital signal over communication path 34. As discussed above, drive signal generator 36 of the transmitter module 32 transmits the drive signal over the same communication path 34. However, in comparison with the digital measurement signal, the analog drive signal has a much lower frequency. Using power line communication modem 46, the digital measurement signal is modulated on communication path 34 so that it is superimposed on the drive signal. As a result, only one set of wires is necessary to carry both the digital measurement signal and the drive signal. Wiring the flowtube module 30 to transmitter module 32 is thus simpler and more economical than if separate communication paths were required for the drive signal and measurement signal. Because the measurement signal transmitted over communication path 34 is a high frequency digital signal, very long wires can be used without significant degradation of the signal. Thus, without adversely affecting measurement quality, transmitter module 32 can be located at a convenient location near a suitable power source and away from hazards while the flowtube module 30 is located near flowtube 12.

Referring again to FIG. 2, transmitter module 32 includes a corresponding power line communication modem 56 configured for cooperation with power line communication modem 46. The power line communication modem 56 is configured to demodulate the digital measurement signal, as well as any other digital data modulated onto the communication path 34 by power line communication modem 46, from the drive signal on communication path 34. In addition, the power line communication modem 56 is configurable for sending digital commands to the flowtube module 30 that are demodulated using the modem 46. For example, it is contemplated that the power line communication modem 56 can modulate commands requesting calibration data or initializing a data acquisition mode from or at the flowtube module 30.

The illustrated transmitter module 32 further includes a transmitter processor 58. The transmitter processor 58 receives the demodulated measurement signal from power line communication modem 56 and uses it to generate an output signal representative of a flow rate of the fluid flowing through flowtube 12. In one embodiment, transmitter processor 58 can be connected to a processor-readable storage medium (not shown) that stores calibration information for flowmeter 10 along with instructions for calculating a flow rate from the calibration information and the demodulated measurement signal. In other embodiments in which, as discussed above, flowtube processor 44 bundles calibration information for flowmeter 10 with the digital measurement signal, transmitter processor 58 receives the calibration information with the measurement signal. In both cases, transmitter processor 58 uses the measurement signal and the calibration information for flowmeter 10 to generate an output signal representative of the flow rate of the fluid in flowtube 12.

The transmitter module 32 also includes an input/output interface 60. The input/output interface 60 connects transmitter module 32 to a distributed process control network to transmit the flow rate measurement to the network. More specifically, input/output interface 60 is configured to connect transmitter module 32 to an input/output module (not shown) in a process control network.

Figure 4:
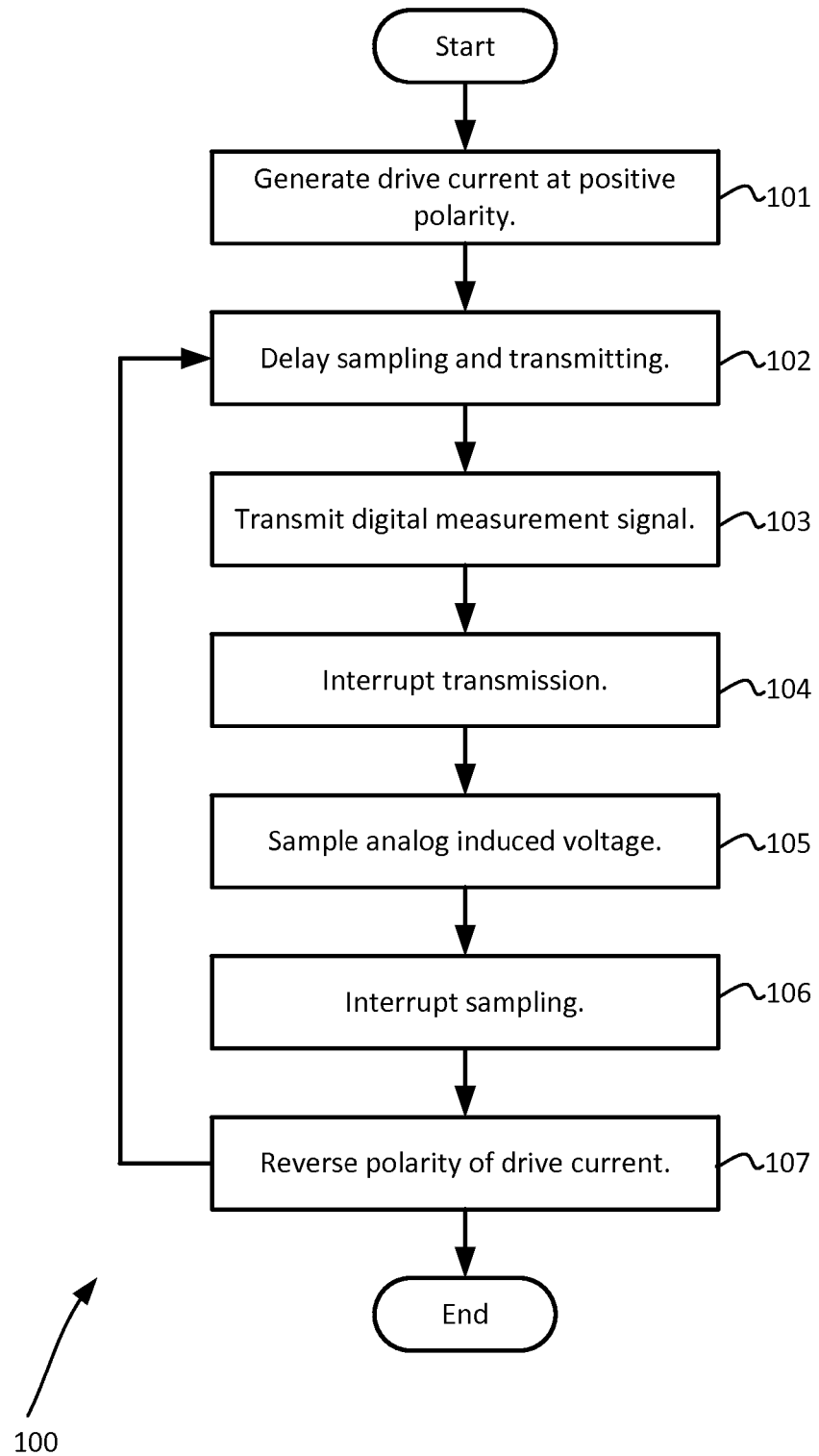
FIG. 4 is an exemplary flowchart illustrating the steps of a method of measuring fluid flow rate according to an embodiment of the invention.
Figure 5:
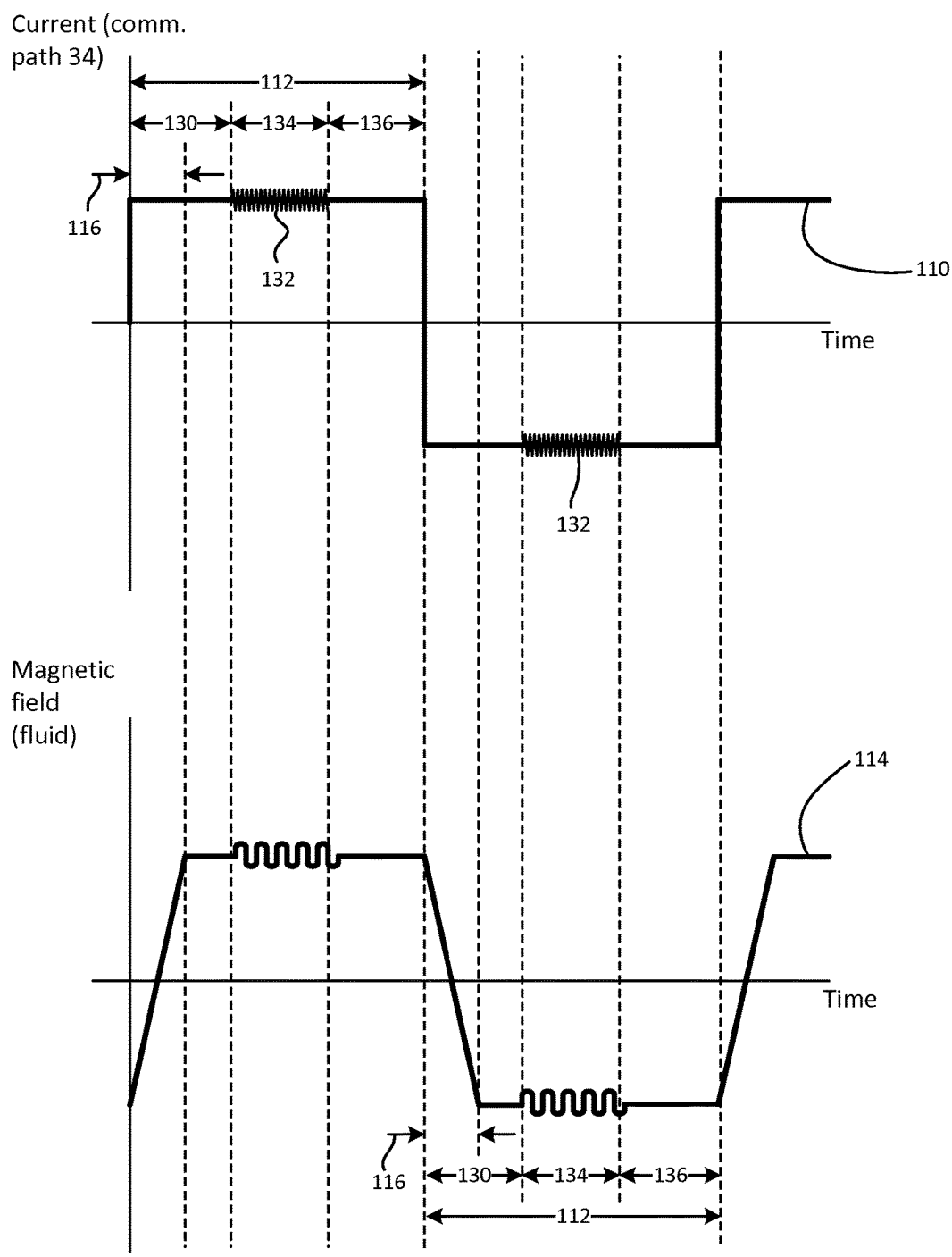
FIG. 5 is an exemplary waveform diagram illustrating current on a communication path of the flowmeter versus time relative to magnetic field strength in a fluid flowing through a flowtube of the flowmeter versus time.

Referring to FIGS. 4 and 5, in one method of measuring a fluid flow rate 100, which is preferably performed using flowmeter 10, the drive signal generator 36 generates a drive current 110 at a positive polarity during a first driving period 112 (step 101). It will be appreciated that the polarity of the drive current 110 could also be negative during the first driving period 112 without departing from the scope of the invention. The drive current 110 is transmitted over communication path 34 to the flowtube module 30 and further to the drive coils 14. The drive current 110 energizes the drive coils 14, which generate a magnetic field 114 in the fluid flowing through flowtube 12. The magnetic field in the flowing fluid induces a voltage difference at the electrodes 16, which produce an analog induced voltage signal representative of the voltage difference.

As shown in FIG. 5, during a first stabilization interval 116, the electromagnetic field 114 is unstable (as illustrated by the sloped line for the magnetic field during the interval 116). As a result, the analog induced voltage signal produced by the electrodes 16 during the first stabilization interval 116 does not accurately correspond to the flow rate of the fluid. In addition, the electromagnetic field 114 can cause communication errors when it is unstable. For example, the PLC modem 56 might mistake a transient signal for a communication bit if it demodulates a digital measurement signal from the communication path 34 when the electromagnetic field 114 is unstable. Accordingly, as shown in FIGS. 4 and 5, during a first delay interval 130, flowtube processor 44 prevents the flowtube module 30 from sampling the analog induced voltage or transmitting a digital measurement signal (step 102). Thus, during the first delay interval 130, the partially unstable analog induced voltage signal is not used. Preferably the length of the delay interval 130 is chosen to provide enough time for magnetic field 114 to stabilize before taking further action. In the illustrated embodiment, the first delay interval 130 is slightly longer than the first stabilization interval 116. However, the first delay interval 130 could also be the same duration as the first stabilization interval 116 without departing from the scope of the invention.

In the illustrated method of measuring flow rate 100, flowtube processor 44 controls the operation of the flowtube module 30 so that, after the delay interval 130, the flowtube module 30 samples the analog induced voltage signal at a different time than it transmits the digital measurement signal. In a preferred embodiment, the flowtube processor 44 knows when the drive current 110 reverses polarity based on the rate at which analog-to-digital converter 42 samples the analog induced voltage signal and delays further action until the end of the delay interval 130. In the illustrated embodiment, after the first delay interval 130, the power line communication modem 46 initially transmits a digital measurement signal 132 during a first transmission interval 134 (step 103). During the transmission interval 134, power line communication modem 46 transmits the digital measurement signal 132 representative of a previous sampling of the analog induced voltage signal. As discussed above, power line communication modem 46 superimposes the digital measurement signal 132 on the drive signal 112. As a result, the high frequency digital measurement signal 132 alters drive signal 112 during the transmission window 134, which affects how the drive coils 14 are energized. As illustrated in FIG. 5, this distorts magnetic field 114 during the transmission interval 134. To prevent the distorted magnetic field 114 from adversely affecting measurement accuracy, flowtube processor 44 is configured to interrupt transmission of the digital measurement signal 132 (step 104) before sampling the analog induced voltage (step 105). Alternatively, it is contemplated that the processor could be configured to sample the analog induced voltage signal prior to transmitting the digital measurement signal without departing from the scope of the invention. In either case, the flowtube module 30 is configured to sample the analog induced voltage signal and transmit the digital measurement signal 132 at different times.

At the end of the transmission interval 134, flowtube processor 44 interrupts the transmission of the digital measurement signal 132 (step 104) and causes analog-to-digital converter 42 to sample the analog induced voltage signal during a sampling interval 136 (step 105). In certain embodiments, analog-to-digital converter 42 only samples the analog induced voltage signal during the sampling interval 136, and the samples taken during the interval are transmitted in the digital measurement signal 132 during a subsequent transmission interval 134. It is understood that the analog-to-digital converter 42 could also continuously sample the analog induced voltage signal if the flowtube module 30 is otherwise configured to select those samples taken during a time (e.g., the sampling interval 136) at which power line communication modem 46 does not transmit the digital measurement signal 132 on communication path 34. In an embodiment in which the analog-to-digital converter continuously samples the analog induced voltage signal, the flowtube processor uses the samples taken during the sampling interval 136 for subsequent transmission to transmitter module 32.

After sampling the analog induced voltage signal during the first sampling interval 136 (step 105), flowtube processor 44 interrupts the sampling interval (step 106) before reversing the polarity of drive current 110 (step 107). In the illustrated method of measuring flow rate 100 the polarity of the drive current is reversed at step 107 but it is contemplated that the magnitude of the drive current could be changed in other ways without departing from the scope of the invention. During a second driving interval 112, drive signal generator 36 transmits a negative drive current to the drive coils 14. The change in drive current 110 (in the illustrated embodiment, a reversal of polarity) creates new instability in magnetic field 114. As shown in FIG. 4, the method of measuring flow rate 100 returns to step 102 and delays sampling the analog induced voltage signal and transmitting the digital measurement signal 132 for a second delay interval 130 to allow magnetic field 114 to stabilize during a second stabilization interval 116. After the second delay interval 130, the flowtube module 30 transmits the digital measurement signal 132 (step 103), which represents the induced voltage signal sampled during the first sampling interval 136, during a second transmission interval 134. The flowtube processor 44 interrupts the second transmission interval 134 (step 104), and then the analog-to-digital converter samples the analog voltage signal during a second sampling window 136 (step 105). The flowtube processor 44 interrupts the second sampling interval (step 106) before reversing the polarity of drive current 110 back to positive (step 107). This sequence is repeated for as long as flowmeter 10 is used to measure a fluid flow rate.

Advantageously, aspects of the invention enable transmitter modules to be located remote from the other hardware in a magnetic flowmeter. Since only a single communication path is necessary, wiring between transmitter modules and flowtube modules is made easier and less expensive. In addition, aspects of the invention enable calibration data to be stored locally to the flowtube module, which allows transmitter modules to be used interchangeably without significant downtime for recalibration. These aspects are, in part, made possible without adversely affecting the measurement quality for the flowmeter because measurement samples are taken and transmitted during intervals particularly selected to optimize measurement accuracy.

The Abstract and summary are provided to help the reader quickly ascertain the nature of the technical disclosure. They are submitted with the understanding that they will not be used to interpret or limit the scope or meaning of the claims. The summary is provided to introduce a selection of concepts in simplified form that are further described in the Detailed Description. The summary is not intended to identify key features or essential features of the claimed subject matter, nor is it intended to be used as an aid in determining the claimed subject matter.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment.

Embodiments of the aspects of the invention may be described in the general context of data and/or processor-executable instructions, such as program modules, stored on one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

Throughout the specification and claims, terms such as "item," "element," "object," etc. may be used interchangeably to generically describe or identify software or display features unless otherwise indicated.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A magnetic flowmeter comprising:
    a flowtube module configured to sample a voltage induced in a fluid flowing through a flowtube and to generate a measurement signal representative thereof, said voltage being induced in response to a magnetic field applied to the fluid;
    a transmitter module configured to generate a drive signal for driving the magnetic field applied to the fluid and to measure a flow rate of the flowing fluid as a function of the measurement signal; and
    a communication path between the flowtube module and the transmitter module for communicating both the drive signal from the transmitter module to the flowtube module and the measurement signal from the flowtube module to the transmitter module.

2. The magnetic flowmeter of claim 1 wherein the flowtube module comprises a power line communications modem configured to modulate the measurement signal on the communication path.

3. The magnetic flowmeter of claim 1 wherein the transmitter module comprises a power line communications modem configured to demodulate the measurement signal from the communication path.

4. The magnetic flowmeter of claim 1 wherein the flowtube module includes an analog front end configured to process an analog induced voltage signal.

5. The magnetic flowmeter of claim 1 further comprising a pair of electrodes configured to detect the induced voltage, wherein the flowtube module is connected to the electrodes to sample the induced voltage detected thereby.

6. The magnetic flowmeter of claim 1 further comprising a pair of coils located near the flowtube and carrying a reversible current for generating the magnetic field, wherein the flowtube module is connected to the coils to supply the drive signal to the coils.

7. The magnetic flowmeter of claim 1 wherein the transmitter module comprises an input/output interface for connecting the transmitter module to an input/output module in a process control network.

8. The magnetic flowmeter of claim 1 wherein the transmitter module comprises a transmitter processor configured to receive the measurement signal, use information in the received measurement signal to determine the flow rate, and generate an output signal representative of the flow rate.

9. The magnetic flowmeter of claim 1 wherein the drive signal comprises an analog signal and the measurement signal comprises a digital signal superimposed on the drive signal.

10. A magnetic flowmeter comprising:
    a flowtube configured to carry a flowing fluid;
    a magnetic field source configured to apply a magnetic field to the flowing fluid;
    a pair of electrodes configured to measure a voltage induced in the flowing fluid between the electrodes in response to the magnetic field;
    a flowtube module connected to the pair of electrodes and configured to receive an analog measurement signal representative of the voltage between the electrodes, the flowtube module comprising an analog to digital converter configured to convert the analog measurement signal into a digital measurement signal;
    a transmitter module configured to receive the digital measurement signal from the flowtube module, determine a flow rate of the flowing fluid from the digital measurement signal, and provide an output signal representative of the flow rate of the flowing fluid; and
    a communication path between the flowtube module and the transmitter module;
    wherein the flowtube module comprises a power line communications modem configured to modulate the digital measurement signal on the communication path and the transmitter module comprises a power line communications modem configured to demodulate the digital measurement signal from the communication path.

11. The magnetic flowmeter of claim 10 wherein the digital measurement signal comprises communications packets containing one or more of measurement data, diagnostic data, tube identity data, and calibration data.

12. The magnetic flowmeter of claim 10 wherein the communication path comprises a single communication path configured to communicate both a drive signal from the transmitter module to the flowtube module and the digital measurement signal from the flowtube module to the transmitter module, wherein the magnetic field is generated based on the drive signal.

13. The magnetic flowmeter of claim 10 wherein the flowtube module further comprises an analog front end configured to receive and process the analog measurement signal.

14. The magnetic flowmeter of claim 10 wherein the magnetic field source comprises a pair of coils located near the flowtube and carrying a reversible current.

15. A magnetic flowmeter comprising:
a flowtube configured to carry a flowing fluid;
a magnetic field source configured to apply a magnetic field in the flowing fluid;
a pair of electrodes configured to detect a voltage induced in the flowing fluid between the electrodes in response to the magnetic field;
a flowtube module configured to sample the detected voltage and generate a measurement signal representative of the voltage; and
a transmitter module configured to generate a drive signal for driving the magnetic field applied to the fluid and to measure a flow rate of the flowing fluid as a function of the measurement signal;
wherein the flowtube module samples the detected induced voltage and transmits the measurement signal to the transmitter module at different times.

16. The magnetic flowmeter of claim 15 wherein the flowtube module is configured to delay transmitting the measurement signal for a predetermined interval after the drive signal changes to allow the magnetic field to settle.

17. The magnetic flowmeter of claim 16 wherein the flowtube module is further configured to interrupt transmitting the measurement signal before sampling the detected induced voltage.

18. The magnetic flowmeter of claim 15 wherein the measurement signal is a function of the sampled induced voltage from a prior sampling of the detected induced voltage.

19. The magnetic flowmeter of claim 18 wherein the prior sampling of the detected induced voltage is a sampling of the detected induced voltage before the drive signal most recently changed.

20. The magnetic flowmeter of claim 15 wherein the drive signal comprises a positive driving period and a negative driving period, and wherein the flowtube module is configured to, during each of the positive and negative driving periods, delay transmitting the measurement signal during a first interval to allow the magnetic field to settle, transmit the measurement signal during a second interval, and sample the detected voltage induced in the flowing fluid during a third interval.

21. The magnetic flowmeter of claim 15 wherein the drive signal and the measurement signal are transmitted on the same communication path.

* * * * *